Dec. 8, 1931.    J. R. CAUTLEY    1,835,467
WHEEL MOUNTING
Filed March 29, 1926

INVENTOR
JOHN R. CAUTLEY
BY
ATTORNEY

Patented Dec. 8, 1931

1,835,467

UNITED STATES PATENT OFFICE

JOHN R. CAUTLEY, OF SOUTH BEND, INDIANA, ASSIGNOR TO BENDIX BRAKE COMPANY, OF SOUTH BEND, INDIANA, A CORPORATION OF ILLINOIS

WHEEL MOUNTING

Application filed March 29, 1926. Serial No. 98,113.

This invention relates to wheels, and is illustrated as embodied in a swivelled mounting for a front automobile wheel. An object of the invention is to prevent oscillation or "shimmying" of the wheel, especially with a balloon tire, by damping out or throttling the angular vibrations before they build up sufficiently to be noticeable.

In one desirable arrangement, there are parts moving respectively with the axle and with the knuckle, and arranged to control a resisting medium, preferably oil or other fluid, in such a manner that there is no substantial resistance to relatively slow swivelling of the wheel, as in steering, whereas there is a very high resistance to rapid oscillations or "shimmying".

The above and other objects and features of the invention, including various novel combinations of parts and desirable particular constructions, will be apparent from the following description of the illustrative embodiments shown in the accompanying drawings, in which.

Figure 1:
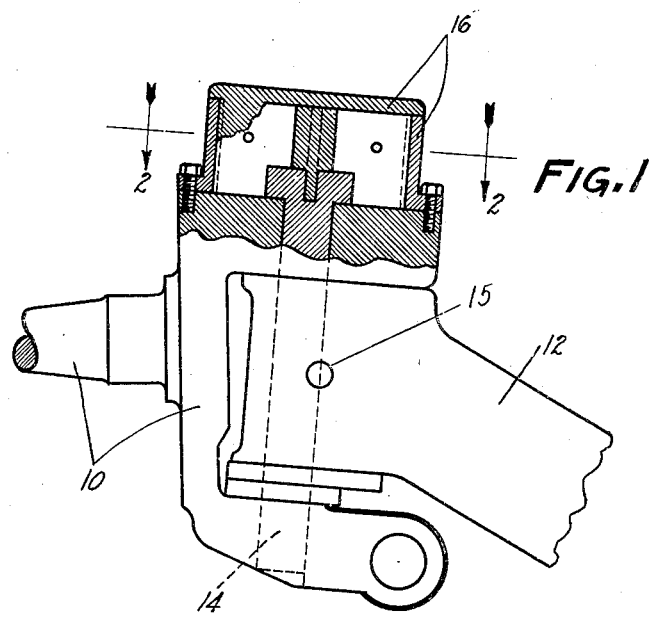
Figure 1 is a partial rear elevation, partly broken away in central vertical section, of a front wheel knuckle and one end of the axle.
Figure 2:
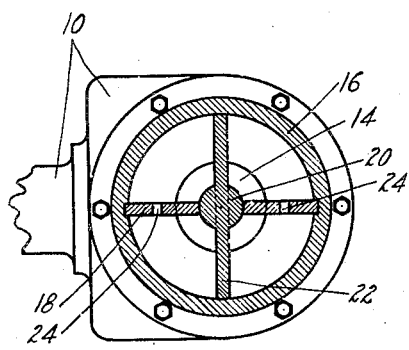
Figure 2 is a horizontal section on the line 2—2 of Fig. 1, showing the means for damping out undesired oscillations.

In the arrangement selected for illustration, a knuckle 10 for a front wheel is swivelled to one end of an axle 12 by any suitable means such as a king-pin 14.

The pin 14 is preferably non-rotatably mounted in the axle 12 by a key 15 as is the usual custom.

One desirable damping means includes a reservoir 16, secured to the top of knuckle 10 over the end of king-pin 14 and preferably containing a fluid such as the oil for lubricating the king-pin, and formed with a fixed partition 18. The king-pin is formed with a cylindrical extension 20 carrying a movable partition 22. One of the partitions, shown as the partition 18, is formed with small fluid passages 24.

When the wheel is swivelled relatively slowly, as in steering, the fluid flows freely through passages 24, and there is substantially no resistance to the turning of the wheel. When, however, there are sudden impulses of the type which build up into undesired oscillations, as sometimes happens when the wheel is provided with a balloon tire, the passage of fluid through passages 24 is throttled down to a rate which interposes a high resistance to the turning of the knuckle. Thus the "shimmying" is damped out before it really starts.

Figure 3:
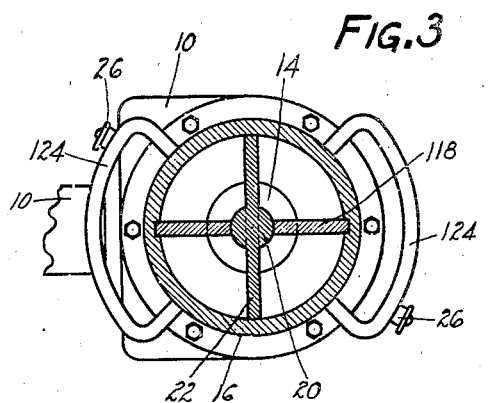
Figure 3 is a view corresponding to Figure 2, but showing a modification.

In the arrangement of Fig. 3, partition 118, corresponding to partition 18, is not formed with openings, the fluid being by-passed around the ends of the partition by small conduits 124, preferably adjustable as to the rate of fluid passage by any suitable valves 26.

While two illustrative embodiments have been described in detail, it is not my intention to limit the scope of the invention to those particular embodiments, or otherwise than by the terms of the appended claims.

I claim:

1. A vehicle having an axle and a knuckle swivelled to the axle, and comprising, in combination therewith, co-operating parts carried respectively by the axle and the knuckle, one of which parts is movable relative to the other upon the swivelling of the wheel, and means, supported by said knuckle, said means housing a resisting medium engaging both parts, one of said parts being formed so as to enable said medium to resist sudden angular movements of the knuckle but interpose practically no resistance to gradual angular movements of the knuckle.

2. A vehicle having an axle and a knuckle and a king-pin swivelling the knuckle to the axle, and comprising, in combination therewith, a fluid reservoir carried by the knuckle having at least one fixed partition, at least one movable partition in the reservoir carried by the king-pin, and at least one passage forming a by-pass permitting the slow passage of fluid past one of the partitions but resisting rapid fluid movement.

3. A vehicle having an axle provided with a king-pin and a knuckle swivelled thereon, in combination with mechanism operable to regulate the swivelling of the knuckle upon the king-pin comprising a reservoir carried by the knuckle surmounting the king-pin and containing a fluid medium, and a part carried by the axle and positioned within the reservoir to be acted upon by the fluid therein to impose a resistance to the sudden swivelling movement of the knuckle.

In testimony whereof, I have hereunto signed my name.

JOHN R. CAUTLEY.